(12) United States Patent
Kuo

(10) Patent No.: US 9,252,854 B2
(45) Date of Patent: Feb. 2, 2016

(54) USER EQUIPMENT HAVING CHANNEL QUALITY INDICATOR FEEDBACK MECHANISM

(71) Applicant: Industrial Technology Research Institute, Hsinchu (TW)

(72) Inventor: Ping-Heng Kuo, Pingtung County (TW)

(73) Assignee: Industrial Technology Research Institute, Hsinchu (TW)

( * ) Notice: Subject to any disclaimer, the term of this patent is extended or adjusted under 35 U.S.C. 154(b) by 0 days.

(21) Appl. No.: 14/294,149

(22) Filed: Jun. 3, 2014

(65) Prior Publication Data

US 2014/0362939 A1 Dec. 11, 2014

Related U.S. Application Data

(60) Provisional application No. 61/832,158, filed on Jun. 7, 2013.

(51) Int. Cl.
*H04B 7/02* (2006.01)
*H04B 7/04* (2006.01)
*H04B 7/06* (2006.01)

(52) U.S. Cl.
CPC ............ *H04B 7/0456* (2013.01); *H04B 7/0452* (2013.01); *H04B 7/0632* (2013.01); *H04B 7/0634* (2013.01)

(58) Field of Classification Search
CPC ...... H04B 7/02; H04B 7/0456; H04B 7/0417; H04L 1/02; H04L 1/06; H04L 1/04
USPC .................................. 375/267, 299, 347–349
See application file for complete search history.

(56) References Cited

U.S. PATENT DOCUMENTS

| 7,729,442 | B2 * | 6/2010 | Kim et al. ...................... 375/295 |
| 8,654,663 | B2 * | 2/2014 | Prasad et al. .................. 370/252 |
| 8,705,510 | B2 * | 4/2014 | Kim et al. ...................... 370/350 |
| 8,718,665 | B2 * | 5/2014 | Kim et al. .................. 455/452.2 |
| 8,804,867 | B2 * | 8/2014 | Jongren et al. ................. 375/267 |
| 8,842,773 | B2 * | 9/2014 | Jongren et al. ................. 375/296 |
| 8,913,682 | B2 * | 12/2014 | Nam et al. ..................... 375/267 |

(Continued)

OTHER PUBLICATIONS

Clayton Shepard, et al., "Argos: Practical Many-Antenna Base Stations," Mobicom '12 Proceedings of the 18th annual international conference on Mobile computing and networking, Aug. 22, 2012, pp. 53-pp. 64.

(Continued)

*Primary Examiner* — Emmanuel Bayard
(74) *Attorney, Agent, or Firm* — Jianq Chyun IP Office

(57) ABSTRACT

The present disclosure proposes a channel quality indicator (CQI) feedback method applicable to a user equipment (UE) using the same method. According to one of the exemplary embodiments, the channel quality indicator (CQI) feedback method would be applicable to a user equipment (UE) and would include steps of at least but not limited to receiving a N×L precoding matrix having N rows and L columns with each of the N rows corresponding to an antenna port and each of the L columns corresponding to a user, wherein N and L are both integers greater than one, performing a channel quality indicator (CQI) calculation for K of the L columns, where $0<K\leq L$, and K is an integer, determining from the CQI calculation for K of the L columns a preferred column, and transmitting information corresponding to the preferred column.

20 Claims, 8 Drawing Sheets

(56) References Cited

U.S. PATENT DOCUMENTS

| | | | |
|---|---|---|---|
| 8,937,899 B2* | 1/2015 | Silva et al. | 370/315 |
| 8,971,434 B2* | 3/2015 | Frenne et al. | 375/267 |
| 2008/0043874 A1* | 2/2008 | Lee et al. | 375/267 |
| 2008/0298482 A1 | 12/2008 | Rensburg et al. | |
| 2009/0116570 A1* | 5/2009 | Bala et al. | 375/260 |
| 2009/0239473 A1 | 9/2009 | Lee et al. | |
| 2011/0164695 A1* | 7/2011 | Zheng et al. | 375/260 |
| 2011/0216714 A1* | 9/2011 | Lee et al. | 370/329 |
| 2011/0243017 A1 | 10/2011 | Prasad et al. | |
| 2011/0319027 A1 | 12/2011 | Sayana et al. | |
| 2012/0082248 A1 | 4/2012 | Han et al. | |
| 2012/0213111 A1* | 8/2012 | Shimezawa et al. | 370/252 |
| 2013/0083865 A1* | 4/2013 | Wu et al. | 375/267 |
| 2013/0315189 A1* | 11/2013 | Kim et al. | 370/329 |
| 2014/0198869 A1* | 7/2014 | Melzer et al. | 375/267 |
| 2014/0226612 A1* | 8/2014 | Kim et al. | 370/329 |
| 2014/0233414 A1* | 8/2014 | Prasad et al. | 370/252 |
| 2014/0241190 A1* | 8/2014 | Park et al. | 370/252 |
| 2014/0301496 A1* | 10/2014 | Ko et al. | 375/267 |
| 2014/0341312 A1* | 11/2014 | Lee et al. | 375/267 |
| 2014/0362937 A1* | 12/2014 | Hammarwall et al. | 375/267 |
| 2014/0364113 A1* | 12/2014 | Kang et al. | 455/422.1 |
| 2015/0236773 A1* | 8/2015 | Kim | H04B 7/0626 375/295 |
| 2015/0256318 A1* | 9/2015 | Jang | H04L 5/0058 370/329 |

OTHER PUBLICATIONS

Young-Han Nam, et al., "Full-Dimension MIMO (FD-MIMO) for Next Generation Cellular Technology," Communications Magazine, IEEE, vol. 51, Issue: 6, Jun. 2013, pp. 172-pp. 179.

Thomas L. Marzetta, "Noncooperative Cellular Wireless with Unlimited Numbers of Base Station Antennas," IEEE Transactions on Wireless Communications, vol. 9, No. 11, Nov. 2010, pp. 3590-3600.

* cited by examiner

| Codebook index | $u_n$ | \multicolumn{4}{c}{Number of layers $\nu$} | | | |
|---|---|---|---|---|---|
| | | 1 | 2 | 3 | 4 |
| 0 | $u_0 = [1\ -1\ -1\ -1]^T$ | $W_0^{\{1\}}$ | $W_0^{\{14\}}/\sqrt{2}$ | $W_0^{\{124\}}/\sqrt{3}$ | $W_0^{\{1234\}}/2$ |
| 1 | $u_1 = [1\ -j\ 1\ j]^T$ | $W_1^{\{1\}}$ | $W_1^{\{12\}}/\sqrt{2}$ | $W_1^{\{123\}}/\sqrt{3}$ | $W_1^{\{1234\}}/2$ |
| 2 | $u_2 = [1\ 1\ -1\ 1]^T$ | $W_2^{\{1\}}$ | $W_2^{\{12\}}/\sqrt{2}$ | $W_2^{\{123\}}/\sqrt{3}$ | $W_2^{\{3214\}}/2$ |
| 3 | $u_3 = [1\ j\ 1\ -j]^T$ | $W_3^{\{1\}}$ | $W_3^{\{12\}}/\sqrt{2}$ | $W_3^{\{123\}}/\sqrt{3}$ | $W_3^{\{3214\}}/2$ |
| 4 | $u_4 = [1\ (-1-j)/\sqrt{2}\ -j\ (1-j)/\sqrt{2}]^T$ | $W_4^{\{1\}}$ | $W_4^{\{14\}}/\sqrt{2}$ | $W_4^{\{124\}}/\sqrt{3}$ | $W_4^{\{1234\}}/2$ |
| 5 | $u_5 = [1\ (1-j)/\sqrt{2}\ j\ (-1-j)/\sqrt{2}]^T$ | $W_5^{\{1\}}$ | $W_5^{\{14\}}/\sqrt{2}$ | $W_5^{\{124\}}/\sqrt{3}$ | $W_5^{\{1234\}}/2$ |
| 6 | $u_6 = [1\ (1+j)/\sqrt{2}\ -j\ (-1+j)/\sqrt{2}]^T$ | $W_6^{\{1\}}$ | $W_6^{\{13\}}/\sqrt{2}$ | $W_6^{\{134\}}/\sqrt{3}$ | $W_6^{\{1324\}}/2$ |
| 7 | $u_7 = [1\ (-1+j)/\sqrt{2}\ j\ (1+j)/\sqrt{2}]^T$ | $W_7^{\{1\}}$ | $W_7^{\{13\}}/\sqrt{2}$ | $W_7^{\{134\}}/\sqrt{3}$ | $W_7^{\{1324\}}/2$ |
| 8 | $u_8 = [1\ -1\ 1\ 1]^T$ | $W_8^{\{1\}}$ | $W_8^{\{12\}}/\sqrt{2}$ | $W_8^{\{124\}}/\sqrt{3}$ | $W_8^{\{1234\}}/2$ |
| 9 | $u_9 = [1\ -j\ -1\ -j]^T$ | $W_9^{\{1\}}$ | $W_9^{\{14\}}/\sqrt{2}$ | $W_9^{\{134\}}/\sqrt{3}$ | $W_9^{\{1234\}}/2$ |
| 10 | $u_{10} = [1\ 1\ 1\ -1]^T$ | $W_{10}^{\{1\}}$ | $W_{10}^{\{13\}}/\sqrt{2}$ | $W_{10}^{\{123\}}/\sqrt{3}$ | $W_{10}^{\{1324\}}/2$ |
| 11 | $u_{11} = [1\ j\ -1\ j]^T$ | $W_{11}^{\{1\}}$ | $W_{11}^{\{13\}}/\sqrt{2}$ | $W_{11}^{\{134\}}/\sqrt{3}$ | $W_{11}^{\{1324\}}/2$ |
| 12 | $u_{12} = [1\ -1\ -1\ 1]^T$ | $W_{12}^{\{1\}}$ | $W_{12}^{\{12\}}/\sqrt{2}$ | $W_{12}^{\{123\}}/\sqrt{3}$ | $W_{12}^{\{1234\}}/2$ |
| 13 | $u_{13} = [1\ -1\ 1\ -1]^T$ | $W_{13}^{\{1\}}$ | $W_{13}^{\{13\}}/\sqrt{2}$ | $W_{13}^{\{123\}}/\sqrt{3}$ | $W_{13}^{\{1324\}}/2$ |
| 14 | $u_{14} = [1\ 1\ -1\ -1]^T$ | $W_{14}^{\{1\}}$ | $W_{14}^{\{13\}}/\sqrt{2}$ | $W_{14}^{\{123\}}/\sqrt{3}$ | $W_{14}^{\{3214\}}/2$ |
| 15 | $u_{15} = [1\ 1\ 1\ 1]^T$ | $W_{15}^{\{1\}}$ | $W_{15}^{\{12\}}/\sqrt{2}$ | $W_{15}^{\{123\}}/\sqrt{3}$ | $W_{15}^{\{1234\}}/2$ |

Bitmap 453  454

L=8

W=[$W_0$ $W_1$ $W_2$ $W_3$ $W_4$ $W_5$ $W_6$ $W_7$]

551   552 553

$W_{k1}$ =010

$W_{k2}$ =101

$W_{k3}$ =110

$W_f$ (651)=010

Bitmap

USER EQUIPMENT HAVING CHANNEL QUALITY INDICATOR FEEDBACK MECHANISM

CROSS REFERENCE TO RELATED APPLICATION

This application claims the priority benefit of U.S.A. provisional application Ser. No. 61/832,158, filed on Jun. 7, 2013. The entirety of the above-mentioned patent application is hereby incorporated by reference herein and made a part of specification.

TECHNICAL FIELD

The present disclosure is directed to a user equipment (UE) having a channel quality indicator (CQI) feedback mechanism.

BACKGROUND

Precoding has been used as a breamforming technique by weighing a signal stream with an appropriate phase and gain in order to optimize signal transmission at the receiving end. In the advent of the multi-user-multi-input multi-output (MU-MIMO) technology, multiple users could be served by the same radio resource. This could be accomplished by weighing the signal stream of a user or a user group with a precoding vector that is orthogonal from the precoding vectors of other users or user groups.

FIG. 1A illustrates a typical transmitter which operates using a precoding matrix. A type transmitter may have a processor 101 which may have a precoding unit 107 inherent to the processor 101. The processor 101 could be electrically connected to a storage medium 104 such as a disk drive or a flash drive. The storage medium 104 may have a predefined codebook 106 native to the storage medium. The processor 101 would be electrically connected to an analog to digital (A/D) converter and/or a digital to analog (D/A) converter circuit 102 which would be connected to a transceiver circuit 103. The transceiver circuit 103 would be connected to one or more physical antennas 105_1, 105_2 ... 105_n.

Conventionally, the precoding matrix could be constructed based on a channel state information (CSI) extracted from a user feedback such as a preferred precoder index of a predefined codebook. Assuming that the transmitter is the transmitter of a base station, upon receiving a user feedback, the base station may select an appropriate precoding matrix that corresponds to the user. The selected precoding matrix could be according to the user feedback or independent from the user feedback. After selecting the precoding matrix, the precoding unit 107 or the processor 101 would weigh the signal stream of a user according to the selected precoding matrix. The modified signal stream would then be transformed by the D/A converter circuit 102 into an analog signal which would be up-converted by the transceiver circuit 103. The signal stream would then be transmitted by the transceiver circuit 103 through one or more antennas 105_1, 105_2 ... 105_n along with other signal streams simultaneously.

FIG. 1B illustrates an example of a codebook in accordance with a current version of the Long Term Evolution (LTE) standard. The codebook contains 16 PMIs numbered from 0 to 15, and precoder tables for each number of layers.

In cases in which the complete channel knowledge is available at the transmitter, two of the most common linear precoding techniques to construct a precoding matrix may include Conjugate Beamforming and Zero-forcing Beamforming. Assuming that H denote a N×L channel matrix between N antenna ports and L concurrent UEs. By using the Conjugate Breamforming technique, a precoding matrix, W, would be constructed as $W=cH^*$, where $H^*$ is the complex conjugate of H. In other words, Conjugate Beamforming may simply take the complex conjugate of each channel coefficient in H as the breamforming weight, normalized by c. By using the Zero-forcing Breamforming technique, a precoding matrix, W, would be constructed as $W=cH^*(H^TH^*)^{-1}$. The Zero-forcing Breamforming technique would employ the CSI to precode the data-bearing symbols so that they sum to zero, or a 'null', at unintended receivers. For these linear precoding techniques, each column of W would serve as the precoding vector of data intended for a specific UE or a specific UE group.

Both of these linear precoding techniques however would require knowledge of H in order to construct W. In practice, this is more feasible for a communication system operating in time division duplex (TDD) mode. Thus, for a communication system in frequency division duplex (FDD) mode at least, the UE would need to report the status of its channel with respect to the base station, in order to form H. This would result a significant increase of data to be transmitted between a UE and a base station. With a codebook based approach that quantizes a channel into a finite set, a UE would merely need to recommend an index that best matches its channel. However, since the number of transmit antennas is large for FD-MIMO (Full Dimension MIMO, also known as massive-MIMO or large-scale MIMO) schemes, feedbacks of CSI report could be an arduous task as the size of precoder codebook has to be large in order to properly capture possible channel directions.

Consequently, in light of the aforementioned problems, in a setting such as FD-MIMO for MU-MIMO operations there could be alternative methods by which feedback burdens could be drastically reduced relative to convention schemes.

SUMMARY OF THE DISCLOSURE

The present disclosure is directed to a user equipment (UE) that has a channel quality indicator (CQI) feedback mechanism According to one of the exemplary embodiments, the present disclosure is directed to a user equipment (UE) which includes at least but not limited to a transmitter for transmitting wireless data, a receiver for receiving wireless data, and a processor coupled to the transmitter and the receiver. The processor is configured for receiving via the receiver a signaling including a first information related to a channel quality indicator (CQI) threshold and a N×L precoding matrix having N rows and L columns with each of the N rows corresponding to an antenna port and each of the L columns corresponding to a user, wherein N and L are both integers greater than one, obtaining from the first information the CQI threshold and the N×L precoding matrix, performing a channel quality indicator (CQI) calculation for the L columns of the N×L precoding matrix, determining from the CQI calculation for the L columns a preferred column that is above the CQI threshold, and transmitting via the transmitter a second information indicating the preferred column.

According to one of the exemplary embodiments, the present disclosure is directed to a user equipment (UE) which includes at least but not limited to a transmitter for transmitting wireless data, a receiver for receiving wireless data, and a processor coupled to the transmitter and the receiver. The processor is configured for receiving via the receiver a signaling which includes a first information related to a N×L precoding matrix having N rows and L columns with each of the N rows corresponding to an antenna port and each of the L columns corresponding to a user, wherein N and L are both integers greater than one, obtaining from the first information the N×L precoding matrix, performing a channel quality indicator (CQI) calculation for L columns of the N×L precoding matrix, determining from the CQI calculation for the L column a preferred column which has the highest CQI, calculating a hypothetical interference power by assuming the L columns except for the preferred column are used for transmission in order to generate an interference report, and transmitting via the transmitter an index corresponding to the preferred column, the CQI using the preferred column, and the interference report.

According to one of the exemplary embodiments, the present disclosure is directed to a user equipment (UE) which includes at least but not limited to a transmitter for transmitting wireless data, a receiver for receiving wireless data, and a processor coupled to the transmitter and the receiver. The processor is configured for receiving via the receiver a signaling comprising a first information related to a N×L precoding matrix having N rows and L columns with each of the N rows corresponding to an antenna port and each of the L columns corresponding to a user, wherein N and L are both integers greater than one, obtaining from the first information the N×L precoding matrix, selecting K of the L columns of the N×L precoding matrix, where 1<K≤L, and K is an integer and obtaining K CQIs corresponding to the selected K of the L columns, determining from the CQI calculation for K of the L columns a preferred column, and transmitting via the transmitter K indexes corresponding to K of the L columns and K CQIs corresponding to K of the L columns.

According to one of the exemplary embodiments, the present disclosure is directed to a user equipment (UE) which includes at least but not limited to a transmitter for transmitting wireless data, a receiver for receiving wireless data, and a processor coupled to the transmitter and the receiver. The processor is configured for receiving via the receiver a signaling comprising a first information related to a N×L precoding matrix having N rows and L columns with each of the N rows corresponding to an antenna port and each of the L columns corresponding to a user, wherein N and L are both integers greater than one, obtaining from the first information the N×L precoding matrix, determining from the L columns a preferred column, determining a first co-scheduling hypothesis comprising a first set of indexes of M of the L columns, where M is an integer and 1<M≤L, and the indexes of the M of the L columns represent columns to be concurrently used when the preferred column is used by the UE, calculating a first CQI by using the preferred column and the first co-scheduling hypothesis, and transmitting via the transmitter a second information indicating the preferred column, the first co-scheduling hypothesis, and the first CQI.

In order to make the aforementioned features and advantages of the present disclosure comprehensible, exemplary embodiments accompanied with figures are described in detail below. It is to be understood that both the foregoing general description and the following detailed description are exemplary, and are intended to provide further explanation of the disclosure as claimed.

It should be understood, however, that this summary may not contain all of the aspect and embodiments of the present disclosure and is therefore not meant to be limiting or restrictive in any manner. Also the present disclosure would include improvements and modifications which are obvious to one skilled in the art.

BRIEF DESCRIPTION OF THE DRAWINGS

The accompanying drawings are included to provide a further understanding of the disclosure, and are incorporated in and constitute a part of this specification. The drawings illustrate embodiments of the disclosure and, together with the description, serve to explain the principles of the disclosure.

FIG. 1B illustrates an example of a codebook in accordance with a version of the Long Term Evolution (LTE) standard.

DETAILED DESCRIPTION OF DISCLOSED EMBODIMENTS

Figure 1A:
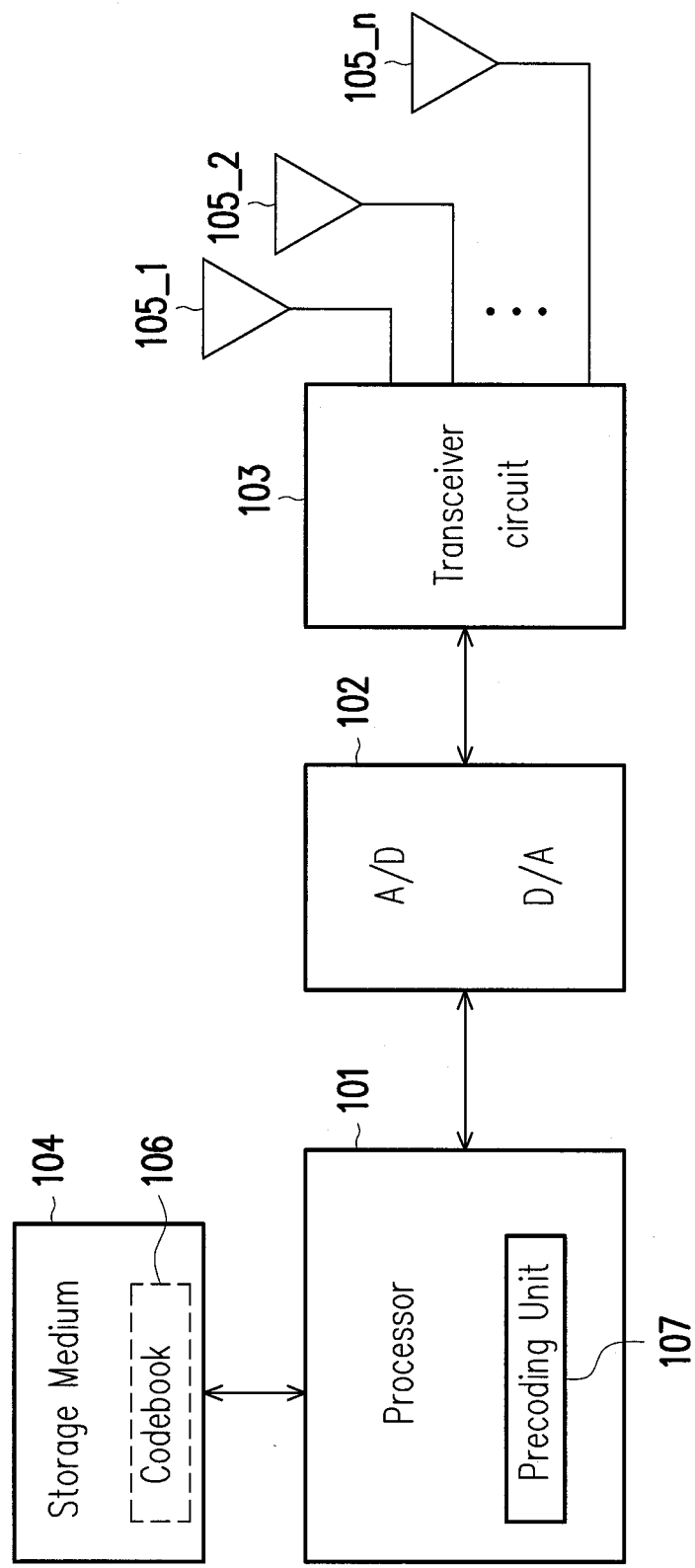
FIG. 1A illustrates a typical transmitter which operates using a precoding matrix.

Reference will now be made in detail to the present exemplary embodiments of the disclosure, examples of which are illustrated in the accompanying drawings. Wherever possible, the same reference numbers are used in the drawings and the description to refer to the same or like parts.

In light of the aforementioned problems, the present disclosure proposes a channel quality indicator (CQI) feedback mechanism. By using the proposed mechanism, feedback burdens could be reduced relative to conventional CSI report schemes.

Figure 2:
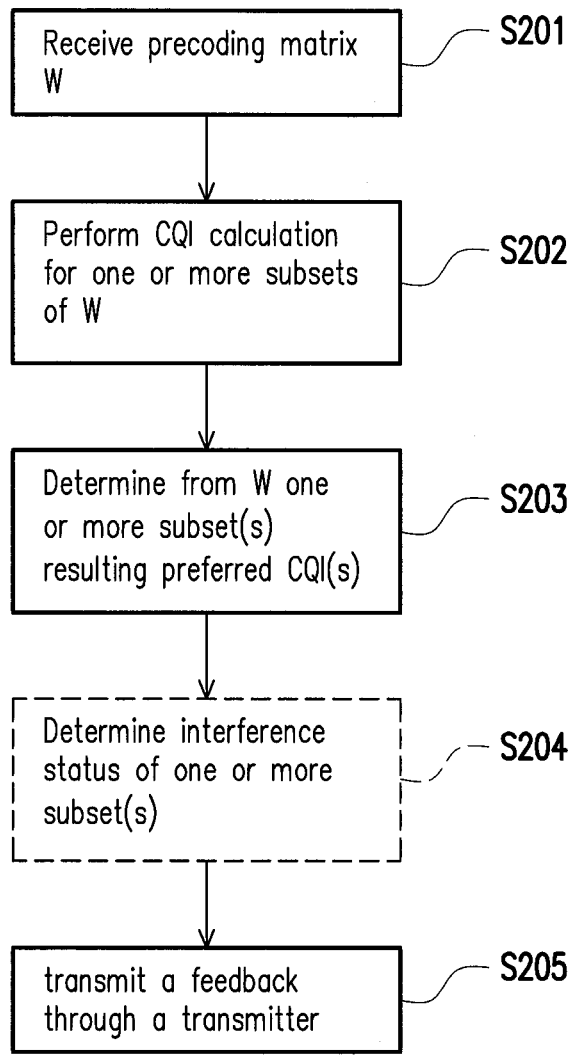
FIG. 2 illustrates a proposed a channel quality indicator (CQI) feedback method applicable to a user equipment (UE).

FIG. 2 illustrates a proposed a channel quality indicator (CQI) feedback mechanism applicable to a UE communicating with a base station in a wireless network. In step S201, a UE would receive a precoding matrix, W. The precoding matrix, W, could be transmitted from a base station using a transmitter having multiple antennas. The precoding matrix, W, for example could be selected or constructed by the base station and has a dimension of N row vectors times L column vectors (N×L). N stands for the number of antenna ports, and L represents the maximum number of UE groups that the transmitter intends to jointly serve by MU-MIMO, where a UE group could have at least one UE. In step S202, the UE would perform CQI calculations for one or more subsets of columns of W, assuming that each of these columns in these subsets is used to precode the data for the UE. For example, a UE could perform channel measurements using reference signals received from the base station and obtain a signal-to-noise-plus-interference-ratio (SINR) from which the CQI calculation for the one or more subsets could be based on. In step S203, the UE would determine from W one or more preferred subsets(s) which would result in having preferred the highest CQI value. In the optional step S204, the UE would determine interference status of one or more subset(s) which are not the preferred one or more subsets. In step S205, the UE would transmit a feedback through a transmitter, and the feedback would include at least but not limited to the preferred subset (or column) of W and the CQI value that results from using the preferred subset of W. To further elucidate the proposed mechanism, four similar exemplary embodiments are provided in subsequent figures and written descriptions.

According to the first exemplary embodiment, the present disclosure is directed to a user equipment (UE) which includes at least but not limited to a transmitter for transmitting wireless data, a receiver for receiving wireless data, and a processor coupled to the transmitter and the receiver. The processor could be configured for receiving via the receiver a signaling including a first information related to a channel quality indicator (CQI) threshold and a N×L precoding matrix having N rows and L columns with each of the N rows corresponding to an antenna port and each of the L columns corresponding to a user, wherein N and L are both integers greater than one, obtaining from the first information the CQI threshold and the N×L precoding matrix, performing a channel quality indicator (CQI) calculation for the L columns of the N×L precoding matrix, determining from the CQI calculation for the L columns a preferred column that is above the CQI threshold, and transmitting via the transmitter a second information indicating the preferred column.

The second information would include a bitmap indicating the preferred column that is higher than the CQI threshold. The bitmap could be a L bits binary sequence representing the L columns sequentially with each bit of the L bits binary sequence representing a different column of the L columns. The each bit of the L bits binary sequence may have a first state or a second state, and the first state indicates the preferred column that is above the CQI threshold.

Figures 3A, 3B:
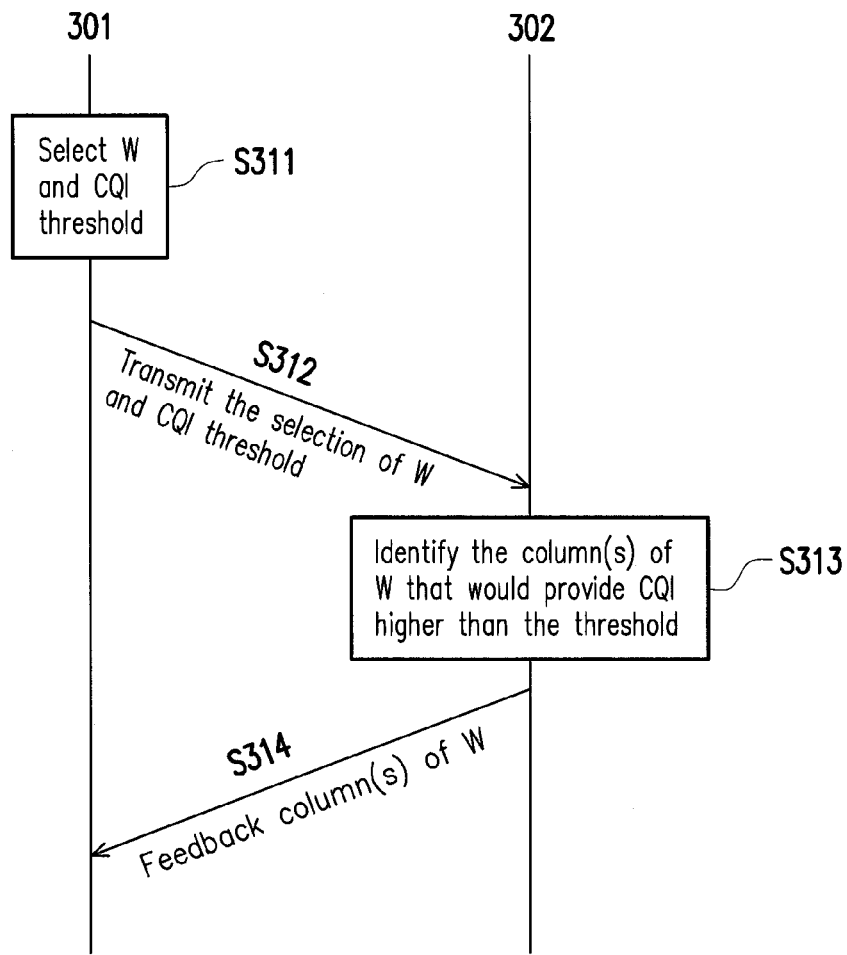
FIG. 3A illustrates a first exemplary embodiment of the proposed channel quality indicator (CQI) feedback method.
FIG. 3B illustrates an example using the first exemplary embodiment of the proposed a channel quality indicator (CQI) feedback method.

FIG. 3A illustrates a first exemplary embodiment of the proposed CQI feedback method. In step S311, a transmitter node 301 may select a precoding matrix, W, having N row vectors and L column vectors. N would correspond to the number of antenna ports of the transmitter and would be an integer greater than one; and L would correspond to the number of UE groups and would be an integer greater or equal to one. The transmitter node 301, for example, could be a base station or an access point. The transmitter node may select the precoding matrix, W, for example, from a predefined set of matrices, and the precoding matrix, W, could be selected, for example, in a random fashion from the predefined set of matrices. The matrix, W, could also be selected, for example, based on the radio resources of interest, such as what frequency band would be used at what time instant. The transmitter node 301 would also determine a CQI threshold. The CQI threshold could be, for example, an integer that represents one of the entries of a predefined table for CQI levels. The predefined table for CQI levels could be, for example, a CQI table currently defined for the LTE communication system; however, the present disclosure does not limit the predefined CQI table to the one used in the LTE standard.

In step S312, the transmitter node 301 would transmit information relating to the selection of the precoding matrix, W, and the CQI threshold via any broadcast, multicast, or unicast method, and the precoding matrix W and the CQI threshold could be assumed to be received by a UE 302. In step S313, the UE 302 would perform channel measurement based on reference signals received from the transmitter node 301, and then the UE 302 would perform CQI calculation based on the channel measurement modified by the precoding matrix, W, so that the UE 302 would be able to determine from W the column(s), $W_f$, having higher CQI value than the received CQI threshold. In step S314, the UE 302 would transmit a feedback to the transmitter node 301, and the feedback would contain at least but not limited to the columns of W resulting higher CQI value than the received CQI threshold or $W_f$. The feedback may optionally contain the CQI values which result from using $W_f$. The feedback, for example, would be implemented as a B-bits bitmap indicating the columns of W, if used to precode the data intended for the UE 302, would provide the UE 302 the CQI value higher than the received CQI threshold level. B is an integer less or equals to L.

FIG. 3B illustrates an example of using the first exemplary embodiment of the proposed CQI feedback method. Assuming that the transmitter node 301 transmits to a UE 302 a CQI threshold and a precoding matrix, W={$W_0, W_1, W_2, W_3, W_4, W_5, W_6, W_7$}, where L=8, and the UE 302 has in turn determined that $W_1$ 350 and $W_5$ 351 are columns that result in CQI values higher than the received CQI threshold when each one of $W_1$ 350 and $W_5$ 351 is used to precode the data intended for the UE 302. The UE 302 would then transmit a feedback having a bitmap which indicates $W_1$ 350 and $W_5$ 351. For example, each bit of the bitmap could represent a different column as the value of the most significant bit could represent $W_0$, the value of second most significant bit could represent $W_1$, and so forth. For each bit, the value of "1" could represent the column that results in CQI value higher than the received CQI threshold and the value of "0" could represent otherwise. Therefore, for the scenario of FIG. 3B, the sequence of the bitmap would be 01000100 with a "1" 352 representing $W_1$ and the other "1" 353 representing $W_5$.

According to one of the exemplary embodiments, the present disclosure is directed to a user equipment (UE) which includes at least but not limited to a transmitter for transmitting wireless data, a receiver for receiving wireless data, and a processor coupled to the transmitter and the receiver. The processor could be configured for receiving via the receiver a signaling which includes a first information related to a N×L precoding matrix having N rows and L columns with each of the N rows corresponding to an antenna port and each of the L columns corresponding to a user, wherein N and L are both integers greater than one, obtaining from the first information the N×L precoding matrix, performing a channel quality indicator (CQI) calculation for L columns of the N×L precoding matrix, determining from the CQI calculation for the L column a preferred column which has the highest CQI, calculating a hypothetical interference power by assuming the L columns except for the preferred column are used for transmission in order to generate an interference report, and transmitting via the transmitter an index corresponding to the preferred column, the CQI using the preferred column, and the interference report.

The index corresponding to the preferred column could be represented by a binary value. The interference report may include a (L−1) bits bitmap sequentially representing the L columns except for the preferred column with each bit of the (L−1) bits binary sequence representing a different column of the L columns other than the preferred column. Each bit of the binary sequence has a first state and a second state, wherein the first state may represent a column by which the lowest hypothetical interference power is calculated. The first may also represent a column by which the highest hypothetical interference power is calculated, a column by which the hypothetical interference power calculated is below a lower predefined threshold, or a column by which the hypothetical interference power calculated is above an upper predefined threshold.

Figure 4A:
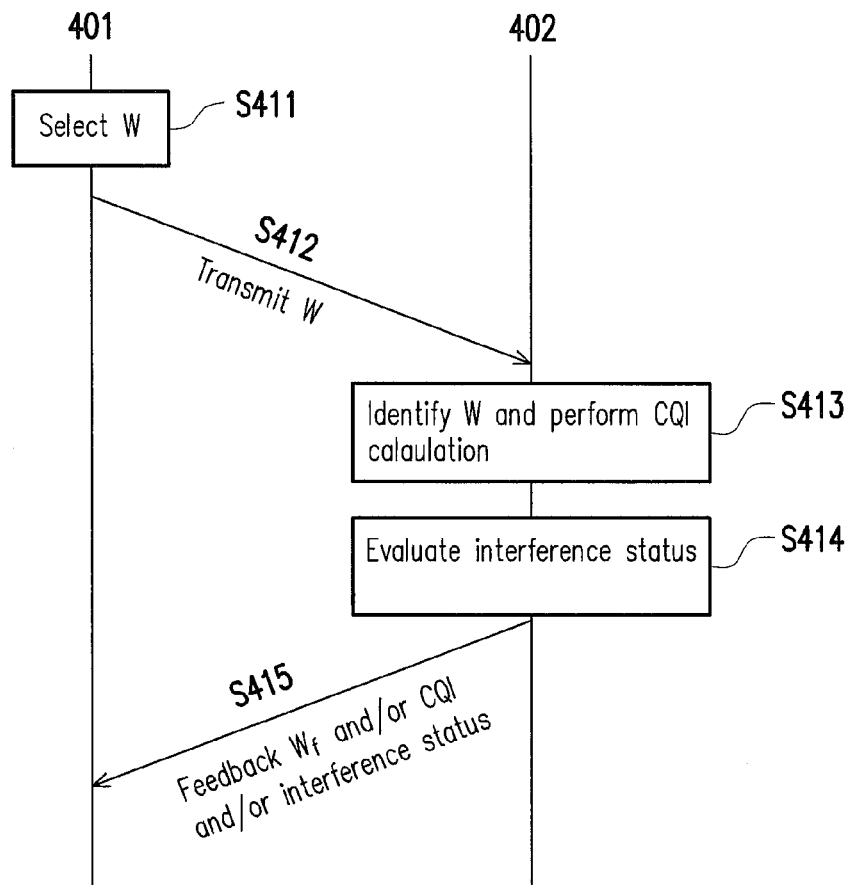
FIG. 4A illustrates a second exemplary embodiment of the proposed channel quality indicator (CQI) feedback method.

FIG. 4A illustrates a second exemplary embodiment of the proposed CQI feedback method. In step S411, a transmitter node 401 may select a precoding matrix, W, having N row vectors and L column vectors. N would correspond to the number of antenna ports of the transmitter and would be an integer greater than one; and L would correspond to the number of UE groups and would be an integer greater than one. The transmitter node 401, for example, could be a base station or an access point. The transmitter node may select the precoding matrix, W, for example, from a predefined set of matrices, and the precoding matrix, W, could be selected, for example, in a random fashion from the predefined set of matrices. The precoding matrix, W, to be selected from a predefined set of matrices could be, for example, a codebook. The matrix, W, could also be selected, for example, based on the radio resources of interest, such as what frequency band would be used or what time slot would be used.

In step S412, the selected precoding matrix, W, would be transmitted from the transmitter node 401 to be received by a UE 402. For this exemplary embodiment, the UE 402 would select from the precoding matrix, W, a preferred or favorite column, $W_f$, that would result in the highest link quality if the $W_f$ is used precode the data intended for the UE 402. The UE 402 would also calculate the CQI resulted from using $W_f$ as the precoding column vector. In step S413, the UE 402 would perform calculations to establish an interference report. The interference report would be used to inform potential interferences which would occur if the remaining columns of W other than $W_f$ or a subset of the remaining columns of W other than $W_f$ are used for MU-MIMO precoding. In step S415, the UE 402 would transmit to the transmitter node 401 a feedback including at least one or a combination of the $W_f$, the CQI corresponding to the $W_f$, and the interference report. Thus, this exemplary embodiment takes interference generated from transmission to the other users into account.

The interference report may include at least one or a combination of the followings: (1) The columns of W other than the $W_f$, or the columns of a subset of columns other than $W_f$, that would generate interference power higher than a predetermined non-zero threshold to the reporting UE. The interference power refers to the interference power to be perceived by the reporting UE assuming that the columns of W other than the preferred column, $W_f$, are used for transmission to other UEs. Such report could be implemented as a S-bits bitmap, where S is the number of columns W other than $W_f$, or the number of columns of a subset of columns other than $W_f$. (2) The columns of W other than the $W_f$, or the columns of a subset of columns other than $W_f$, that would cause interference power to be perceived by the reporting UE to be lower than a predetermined non-zero threshold. Such report could be implemented as a S-bits bitmap, where S is the number of columns W other than $W_f$, or the number of columns of a subset of columns other than $W_f$. (3) The column of W other than the $W_f$ or the columns of a subset of columns other than $W_f$, that would cause the highest interference power to be perceived by the UE 402. (4) The column of W other than the $W_f$ or the columns of a subset of columns other than $W_f$, that would cause the lowest interference power to be perceived by the UE 402. The aforementioned subset of columns other than $W_f$ could be configured by the transmitter node 401 or could be dependent upon $W_f$.

Figure 4B:
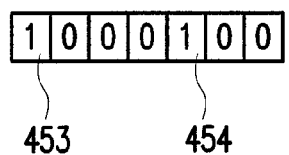
FIG. 4B illustrates an example using the second exemplary embodiment of the proposed a channel quality indicator (CQI) feedback method.

FIG. 4B illustrates a first example using the second exemplary embodiment of the proposed CQI feedback method. Assuming that the transmitter node 401 transmits to a UE 402 a precoding matrix, W={$W_0, W_1, W_2, W_3, W_4, W_5, W_6, W_7$}, where L=8, and the UE 402 has in turn determined that $W_2$ 450 is the $W_f$. Also $W_0$ 451 and $W_5$ 452 are columns other than the $W_f$ that would cause interference power to be perceived by the UE 402 to be lower than a predetermined non-zero threshold. The UE 402 could then transmit one or a combination of the $W_f$ which is $W_2$, the CQI corresponding to $W_2$, and an interference report including $W_0$ 451 and $W_5$ 452 as columns other than the $W_2$ that would cause interference power to be perceived by the UE 402 to be lower than a predetermined non-zero threshold. The $W_f$ could be, for example, transmitted as a binary sequence that has a decimal value equivalent to the index. Thus, $W_2$ for example could be represented by the value of the binary sequence 010 which has a decimal value of 2. The interference report could be a 7 bits bitmap (L−1) bits bitmap) which does not have to include $W_f$. Therefore, for the scenario of FIG. 4B, the sequence of the bitmap would be 1000100 with a "1" 453 representing $W_0$ and the other "1" 454 representing $W_5$.

For another example of the second embodiment, assuming that $W_f$ has been determined by the UE 402 as $W_2$, and the interference report would contain the column(s) of a subset of columns other than $W_f$, that would cause interference power to be perceived by the UE 402 to be lower than a predetermined non-zero threshold. Also in this example, the subset of columns other than $W_f$ has been configured by the network as $W_0, W_3$, and $W_4$ among which $W_0$ has been determined as the column of the subset of columns (i.e. $W_0, W_3$, and $W_4$) other than $W_2$ that would cause interference power to be perceived by the UE 402 to be lower than a predetermined non-zero threshold. In this case, the interference would include the S=3 bit bitmap since only 3 bits would be necessary to cover the subset, and the sequence of the 3 bits bitmap in this example would be "100" with the "1" representing $W_0$ and two zeros representing $W_3$ and $W_4$ respectively.

According to one of the exemplary embodiments, the present disclosure is directed to a user equipment (UE) which includes at least but not limited to a transmitter for transmitting wireless data, a receiver for receiving wireless data, and a processor coupled to the transmitter and the receiver. The processor could be configured for receiving via the receiver a signaling comprising a first information related to a N×L precoding matrix having N rows and L columns with each of the N rows corresponding to an antenna port and each of the L columns corresponding to a user, wherein N and L are both integers greater than one, obtaining from the first information the N×L precoding matrix, selecting K of the L columns of the N×L precoding matrix, where 1<K≤L, and K is an integer and obtaining K CQIs corresponding to the selected K of the L columns, and transmitting via the transmitter K indexes corresponding to K of the L columns and K CQIs corresponding to K of the L columns.

The processor could be configured for selecting K of the L columns of the N×L precoding matrix at least by selecting K of the L columns of the N×L precoding matrix having the best CQI by the UE or at least by receiving information related to a configuration which determines K of the L columns from the receiver.

Figures 5A, 5B:
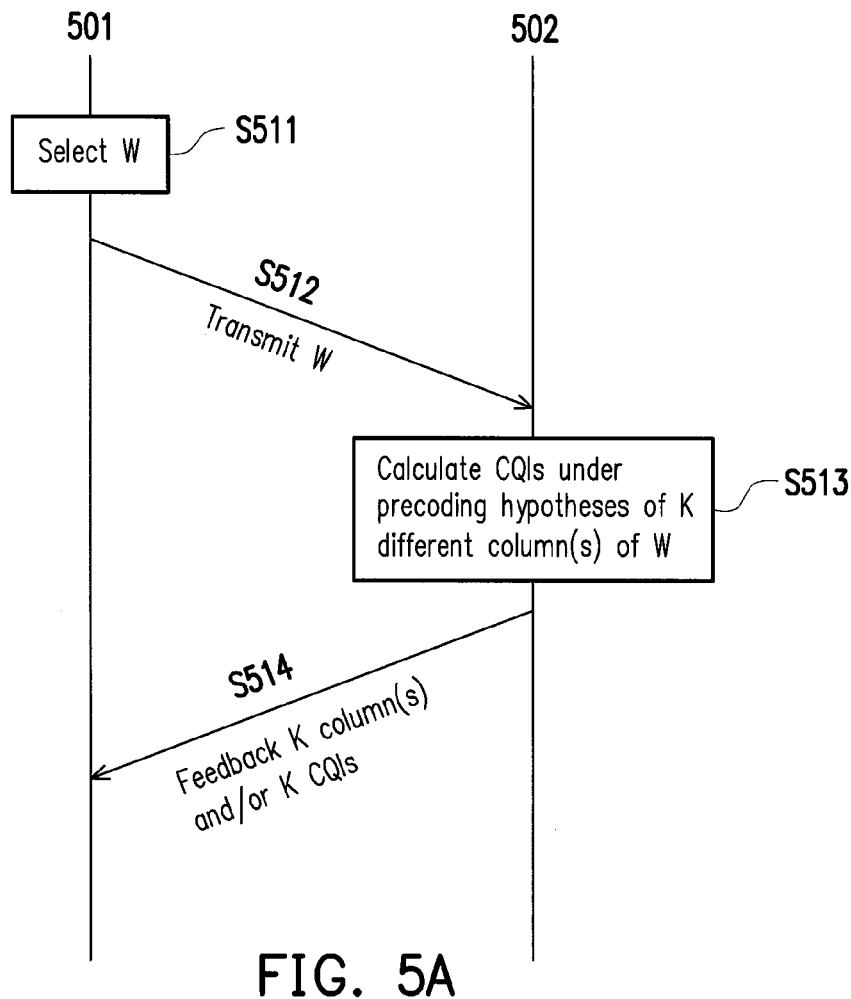
FIG. 5A illustrates a third exemplary embodiment of the proposed channel quality indicator (CQI) feedback method.
FIG. 5B illustrates an example using the third exemplary embodiment of the proposed a channel quality indicator (CQI) feedback method.

FIG. 5A illustrates a third exemplary embodiment of the proposed CQI feedback method. In step S511, a transmitter node 501 may select a precoding matrix, W, having N row vectors and L column vectors. N would correspond to the number of antenna ports of the transmitter and would be an integer greater than one; and L would correspond to the number of UE groups and would be an integer greater than one. The transmitter node 501, for example, could be a base station or an access point. It should be noted that alternatively, the selection of the precoding matrix, W, might not be made by the transmitter node 501 but instead by another network element in the non-access stratum. The transmitter node 501 may select the precoding matrix, W, for example, from a predefined set of matrices, and the precoding matrix, W, could be selected, for example, in a random fashion from the predefined set of matrices. The precoding matrix, W, to be selected from a predefined set of matrices could be, for example, a codebook. The matrix, W, could also be selected, for example, based on the radio resources of interest, such as what frequency band would be used or what time slot would be used.

In step S512, the transmitter node 501 would transmit information relating to W to be received by a UE 502. In step S513, the UE 501 would perform channel estimation using the reference signal from the transmitter node 501 and would use the result from the channel estimation to calculate CQI values for K different columns of W, where K is an integer $1 < K \leq L$. For the exemplary scenario of FIG. 5A, the K columns are determined by the UE 502 as the K best columns. Alternatively, the selection of K could be received from the transmitter node 501 via signaling, and thus in that case step S512 would include the index of each of the K columns. Also, the integer value of K (i.e. the number of columns) could be determined by the UE 502, received from the transmitter node 501, or predetermined offline. After channel estimation and the selection of K columns are completed, the UE 502 may calculate K CQI values by assuming each of the K columns is used as the precoding column vector for data intended for the UE 502. In step S514, the UE 502 may transmit to the transmitter node 501 a feedback including one or a combination of the index of each of the K columns and the K CQI's.

FIG. 5B illustrates an example using the third exemplary embodiment of the proposed CQI feedback method. Assuming that the transmitter node 501 transmits to a UE 502 a precoding matrix, $W = \{W_0, W_1, W_2, W_3, W_4, W_5, W_6, W_7\}$, where L=8, and the UE 502 would determine from W the K best columns, $W_{k1}, W_{k2} \ldots W_{kn}$. It is assumed that the UE 502 has in turn determined that the K best columns are $W_2$ 551, $W_5$ 552, and $W_6$ 553. The UE 502 would transmit one or both of the K best columns which are $W_2$ 551, $W_5$ 552, and $W_6$ 553 and CQI's corresponding to $W_2$ 551, $W_5$ 552, and $W_6$ 553 to the transmitter node 501. The K best columns could each be represented by a binary sequence having a decimal value equal to the index. Therefore, $W_{k1}=W2=010$, $W_{k2}=W5=101$, and $W_{k3}=W6=110$.

According to one of the exemplary embodiments, the present disclosure is directed to a user equipment (UE) which includes at least but not limited to a transmitter for transmitting wireless data, a receiver for receiving wireless data, and a processor coupled to the transmitter and the receiver. The processor could be configured for receiving via the receiver a signaling comprising a first information related to a N×L precoding matrix having N rows and L columns with each of the N rows corresponding to an antenna port and each of the L columns corresponding to a user, wherein N and L are both integers greater than one, obtaining from the first information the N×L precoding matrix, determining from the L columns a preferred column, determining a first co-scheduling hypothesis comprising a first set of indexes of M of the L columns, where M is an integer and $1 < M \leq L$, and the indexes of the M of the L columns represent columns to be concurrently used when the preferred column is used by the UE, calculating a first CQI by using the preferred column and the first co-scheduling hypothesis, and transmitting via the transmitter a second information indicating the preferred column, the first co-scheduling hypothesis, and the first CQI.

The UE could also receive the indexes of M of the L columns for the first co-scheduling hypothesis from a receiver externally before or receiving the precoding matrix or at the same time via the same signaling. The UE may also determine a second set of indexes of the M of the L columns represent columns to be concurrently used when the preferred column is used by the UE or receive the second set of indexes externally. The UE may then calculate a second CQI by using the preferred column and the second co-scheduling hypothesis.

An index corresponding to the preferred column could be represented by a binary value. The first set of indexes of the M of the L columns could be represented by a (L−1) bits bitmap sequentially representing the L columns except for the preferred column with each bit of the (L−1) bits binary sequence representing a different column of the L columns other than the preferred column. Each of the (L−1) bits binary sequence would have a first state and a second state, wherein the first state represents a column which is to be hypothetically assigned.

Figure 6A:
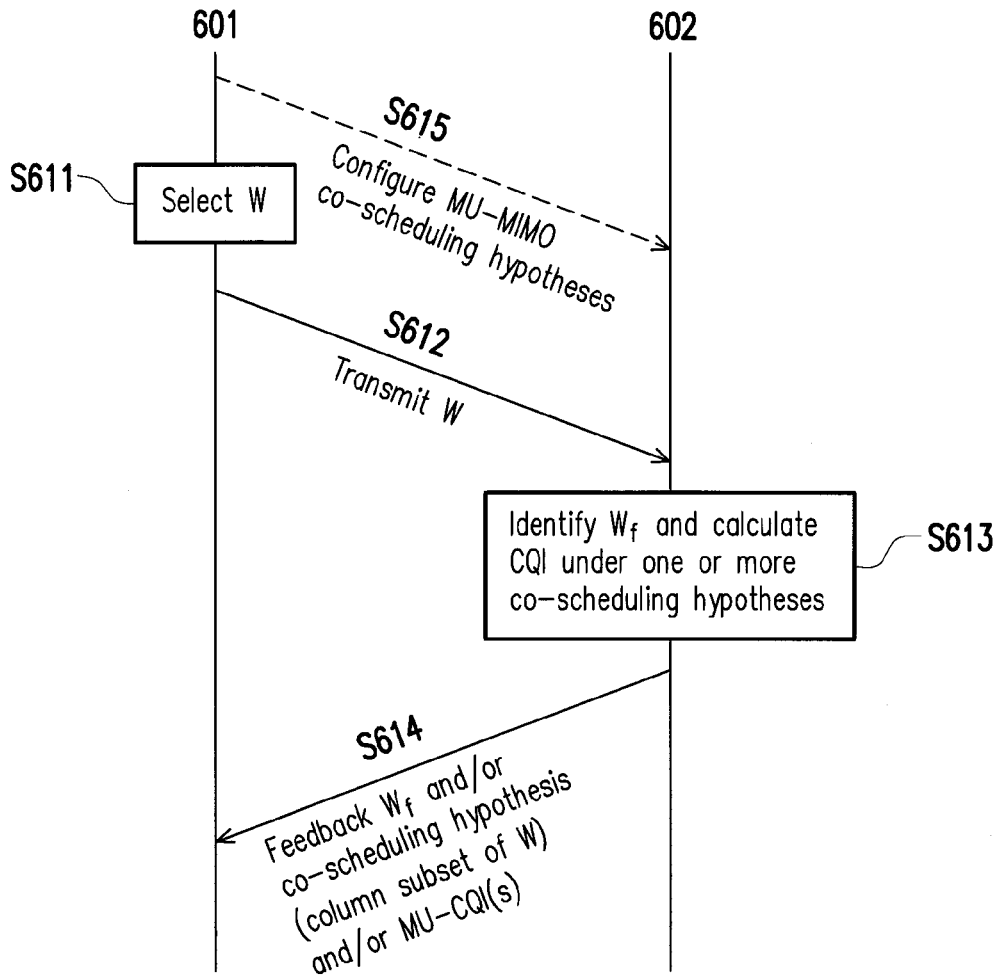
FIG. 6A illustrates a fourth exemplary embodiment of the proposed channel quality indicator (CQI) feedback method.

FIG. 6A illustrates a fourth exemplary embodiment of the proposed CQI feedback method. In step S611, a transmitter node 601 may select a precoding matrix, W, having N row vectors and L column vectors. N would correspond to the number of antenna ports of the transmitter and would be an integer greater than one; and L would correspond to the number of UE groups and would be an integer greater than one. The transmitter node 601, for example, could be a base station or an access point. It should be noted that alternatively, the selection of the precoding matrix, W, might not be made by the transmitter node 601 but instead by another network element in the non-access stratum. The transmitter node 601 may select the precoding matrix, W, for example, from a predefined set of matrices, and the precoding matrix, W, could be selected, for example, in a random fashion from the predefined set of matrices. The precoding matrix, W, to be selected from a predefined set of matrices could be, for example, a codebook. The matrix, W, could also be selected, for example, based on the radio resources of interest, such as what frequency band would be used or what time slot would be used.

However, in an optional step S615, a transmitter node 601 would transmit to a UE 602 a signaling which configures one or more MU-MIMO co-scheduling hypotheses. A co-scheduling hypothesis refers to a hypothetical assignment of columns to one or more UEs other than the reporting UE 602. Step S615 would be optional in the sense that a co-scheduling hypothesis could be determined by a UE 602 rather than received from the transmitter node 601.

In step S612, the transmitter node 601 would transmit W to the UE 602. In step S613, the UE 602 would perform channel measurements in order to calculate $W_f$ or the column of W resulting the highest CQI value than the rest of the columns of W if $W_f$ is used as the precoding column vector to precode the data intended for the UE 602. After identifying the $W_f$, the UE 602 would calculate the resultant CQI of a co-scheduling hypothesis or the resultant CQI's of hypotheses in the case that multiple hypotheses are configured while $W_f$ is being used. In step S614, the UE 602 would transmit to the transmitting node 601 a feedback which includes one or a combination of the $W_f$, the column(s) of W used for each of the co-scheduling hypotheses or a subset of the column(s) of W used for each of the co-scheduling hypotheses, and the resultant CQI under the one or more co-scheduling hypotheses.

Figure 6B:
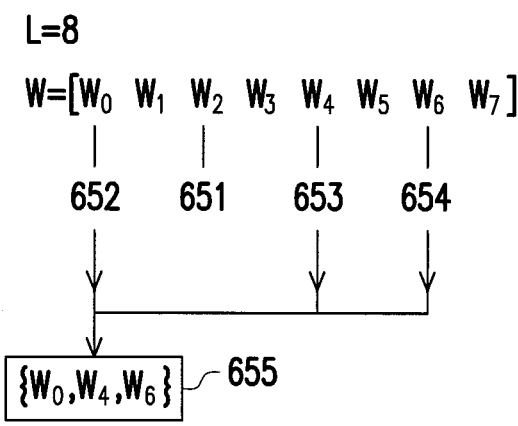
FIG. 6B illustrates an example using the fourth exemplary embodiment of the proposed a channel quality indicator (CQI) feedback method.
Figure 6B:
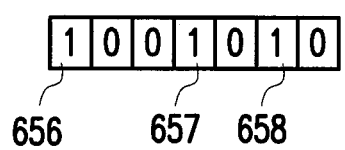

FIG. 6B illustrates an example using the fourth exemplary embodiment of the proposed CQI feedback method. Assuming that the transmitter node 601 transmits to a UE 602 a precoding matrix, $W=\{W_0, W_1, W_2, W_3, W_4, W_5, W_6, W_7\}$, where L=8, and the UE 602 would determine from W the $W_f$ resulting the highest CQI value than the rest of the columns of W if $W_f$ is used as the precoding column vector to precode the data intended for the UE 602. The $W_f$ for the example of FIG. 6B is $W_2$ 651. Assuming that a co-scheduling hypothesis determined by the UE 602 as $W_0$ 652, $W_4$ 653, and $W_6$ 654, the UE 602 would than calculate the resulting CQI value by using $W_2$ 651 and by assuming that the column vectors $W_0$ 652, $W_4$ 653, and $W_6$ 654 have been assigned to other UEs. The UE 602 would then transmit to the transmitter node 601 a feedback including one or a combination of the $W_f$ which is $W_2$ 651, the columns of the co-scheduling hypothesis, $W_0$ 652, $W_4$ 653, and $W_6$ 654, and the resulting CQI under the co-scheduling hypothesis. The $W_f$ for example could be transmitted as an index represented by a binary sequence 010. The columns of the co-scheduling hypothesis in this example could be transmitted as a 7 bits bitmap excluding the bit that represents $W_2$ as it would be superfluous to be transmitted. The bitmap in this example would be 1001010 with the first "1" 656 representing $W_0$, the second "1" 657 representing $W_4$, and the third "1" 658 representing $W_6$.

For another example, assuming that the transmitter node 601 has configured two sets of co-scheduling hypotheses for the UE 602 with the first set being $W_2$ and $W_7$ and the second set being $W_0$, $W_4$, and $W_6$. The UE 602 would than identify the $W_f$ having the best CQI value. Assuming that the $W_f$ has been identified as $W_1$, the UE 602 would calculate the resulting CQI value using $W_1$ as the precoding column vector for the first set that is $W_2$ and $W_7$ and the second set that is $W_0$, $W_4$, and $W_6$. As mentioned previously, for the first set, $W_2$ and $W_7$ have been assumed to have assigned to other UEs; and for the second set, $W_0$, $W_4$, and $W_6$ have been assumed to have assigned to other UEs. The UE 602 would than transmit to the transmitter node 601 a feedback including W1 as the $W_f$ and the CQIs corresponding to the first scheduling hypothesis and the CQIs corresponding to the second scheduling hypothesis.

It should be noted that the present disclosure may extend beyond the first, second, third, and fourth embodiment as it would be apparent for an ordinary person skilled in the art that various combinations of these embodiments could be implemented. Also the designators "first", "second", "third", and "fourth" do not imply one being more preferred than the other as these designators are merely meant to distinguish one embodiment from another as each embodiment could be more valuable than the others during specific circumstances.

In this disclosure, 3GPP-like keywords or phrases are used merely as examples to present inventive concepts in accordance with the present disclosure; however, the same concept presented in the disclosure can be applied to any other systems such as IEEE 802.11, IEEE 802.16, WiMAX, and so like by persons of ordinarily skilled in the art.

A base station in this disclosure may also include base stations such as an advanced base station (ABS), a base transceiver system (BTS), a node B, an evolved node B (eNB), a home eNB, a macro base station, a pico base station, a femto base station, an access point, a home base station, a relay station, a repeater, an intermediate node, an intermediary, and/or satellite-based communication base stations.

From the hardware perspective, a base station may include at least but not limited to a transmitter circuit, a receiver circuit, an analog-to-digital (A/D) converter, a digital-to-analog (D/A) converter, a processing circuit (or a processor), one or more antenna units, and optionally a storage medium. The transmitter and the receiver transmit downlink signals and receive uplink signals wirelessly. The receiver may include functional elements to perform operations such as low noise amplifying, impedance matching, frequency mixing, down frequency conversion, filtering, amplifying, and so forth. The transmitter may include function elements to perform operations such as amplifying, impedance matching, frequency mixing, up frequency conversion, filtering, power amplifying, and so forth. The analog-to-digital (A/D) or the digital-to-analog (D/A) converter is configured to convert from an analog signal format to a digital signal format during uplink signal processing and from a digital signal format to an analog signal format during downlink signal processing.

The processing circuit or processor is configured to process digital signal and to perform functions, processes or procedures, or method steps of the proposed method in exemplary embodiments of the present disclosure. Also, the processing circuit may optionally be coupled to a memory circuit to store programming codes, device configurations, a codebook, buffered or permanent data, and etc. . . . . The functions of the processing circuit may be implemented using programmable units such as a micro-processor, a micro-controller, a DSP chips, FPGA, etc. The functions of the processing circuit may also be implemented with separate electronic devices or ICs, and the processing circuit may also be implemented with either hardware or software.

The term "user equipment" (UE) in this disclosure could represent various embodiments which for example could include but not limited to a mobile station, an advanced mobile station (AMS), a server, a client, a desktop computer, a laptop computer, a network computer, a workstation, a personal digital assistant (PDA), a tablet personal computer (PC), a scanner, a telephone device, a pager, a camera, a television, a hand-held video game device, a musical device, a wireless sensor, and so like. In some applications, a UE may be a fixed computer device operating in a mobile environment, such as a bus, train, an airplane, a boat, a car, and so forth.

From the hardware perspective, a UE may include at least but not limited to a transmitter circuit, a receiver circuit, an analog-to-digital (A/D) converter, a digital-to-analog (D/A) converter, a processing circuit, one or more antenna units, and optionally a memory circuit. The memory circuit may store programming codes, device configurations, buffered or permanent data, codebooks, and etc. . . . . The processing circuit may also be implemented with either hardware or software and would be considered to implement the functions, processes or procedures, and method steps of embodiments of the present disclosure. The function of each element of a UE is similar to a base station and therefore detailed descriptions for each element will not be repeated.

No element, act, or instruction used in the detailed description of disclosed embodiments of the present application should be construed as absolutely critical or essential to the present disclosure unless explicitly described as such. Also, as used herein, each of the indefinite articles "a" and "an" could include more than one item. If only one item is intended, the terms "a single" or similar languages would be used. Furthermore, the terms "any of" followed by a listing of a plurality of items and/or a plurality of categories of items, as used herein, are intended to include "any of", "any combination of", "any multiple of", and/or "any combination of multiples of the items and/or the categories of items, individually or in conjunction with other items and/or other categories of items. Further, as used herein, the term "set" is intended to include any number of items, including zero. Further, as used herein, the term "number" is intended to include any number, including zero.

In all the drawings of the present disclosure, a box enclosed by dotted lines would mean an optional functional element or an optional step which is not absolutely essential, and a dotted line may mean that the process flow could be optional or may not necessarily occur.

It will be apparent to those skilled in the art that various modifications and variations can be made to the structure of the disclosed embodiments without departing from the scope or spirit of the disclosure. In view of the foregoing, it is intended that the disclosure cover modifications and variations of this disclosure provided they fall within the scope of the following claims and their equivalents.

Moreover, the claims should not be read as limited to the described order or elements unless stated to that effect. In addition, use of the term "means" in any claim is intended to invoke 35 U.S.C. §112, ¶6, and any claim without the word "means" is not so intended.

What is claimed is:

1. A user equipment (UE) comprising:
   a transmitter for transmitting wireless data;
   a receiver for receiving wireless data;
   a processor coupled to the transmitter and the receiver and is configured for:
      receiving via the receiver a signaling comprising a first information related to a channel quality indicator (CQI) threshold and a N×L precoding matrix having N rows and L columns with each of the N rows corresponding to an antenna port and each of the L columns corresponding to a user, wherein N and L are both integers greater than one;
      obtaining from the first information the CQI threshold and the N×L precoding matrix;
      performing a channel quality indicator (CQI) calculation for the L columns of the N×L precoding matrix;
      determining from the CQI calculation for the L columns a preferred column that is above the CQI threshold; and
      transmitting via the transmitter a second information indicating the preferred column.

2. The UE of claim 1, wherein the processor is configured for transmitting via the transmitter the second information indicating the preferred column comprising:
   transmitting via the transmitter the second information which comprises a bitmap indicating the preferred column which is higher than the CQI threshold.

3. The UE of claim 2, wherein the bitmap is a L bits binary sequence representing the L columns sequentially with each bit of the L bits binary sequence representing a different column of the L columns.

4. The UE of claim 3, wherein the each bit of the L bits binary sequence has a first state or a second state, and the first state indicates the preferred column that is above the CQI threshold.

5. A user equipment (UE) comprising:
   a transmitter for transmitting wireless data;
   a receiver for receiving wireless data;
   a processor coupled to the transmitter and the receiver and is configured for:
      receiving via the receiver a signaling comprising a first information related to a N×L precoding matrix having N rows and L columns with each of the N rows corresponding to an antenna port and each of the L columns corresponding to a user, wherein N and L are both integers greater than one;
      obtaining from the first information the N×L precoding matrix;
      performing a channel quality indicator (CQI) calculation for L columns of the N×L precoding matrix;
      determining from the CQI calculation for the L column a preferred column which has the highest CQI;
      calculating a hypothetical interference power by assuming the L columns except for the preferred column are used for transmission in order to generate an interference report; and
      transmitting via the transmitter an index corresponding to the preferred column, the CQI using the preferred column, and the interference report.

6. The UE of claim 5, wherein the index corresponding to the preferred column is represented by a binary value.

7. The UE of claim 5, wherein the interference report comprises a (L−1) bits bitmap sequentially representing the L columns except for the preferred column with each bit of the (L−1) bits binary sequence representing a different column of the L columns other than the preferred column.

8. The UE of claim 7, wherein each bit of the binary sequence has a first state and a second state, wherein the first state represents a column by which the lowest hypothetical interference power is calculated.

9. The UE of claim 7, wherein each bit of the binary sequence has a first state and a second state, wherein the first state represents a column by which the highest hypothetical interference power is calculated.

10. The UE of claim 7, wherein each bit of the binary sequence has a first state and a second state, wherein the first state represents a column by which the hypothetical interference power calculated is below a lower predefined threshold.

11. The UE of claim 7, wherein each bit of the binary sequence has a first state and a second state, wherein the first state represents a column by which the hypothetical interference power calculated is above an upper predefined threshold.

12. A user equipment (UE) comprising:
   a transmitter for transmitting wireless data;
   a receiver for receiving wireless data;
   a processor coupled to the transmitter and the receiver and is configured for:
      receiving via the receiver a signaling comprising a first information related to a N×L precoding matrix having N rows and L columns with each of the N rows corresponding to an antenna port and each of the L columns corresponding to a user, wherein N and L are both integers greater than one;
      obtaining from the first information the N×L precoding matrix;
      selecting K of the L columns of the N×L precoding matrix, where 1<K≤L, and K is an integer and obtaining K CQIs corresponding to the selected K of the L columns; and
      transmitting via the transmitter K indexes corresponding to K of the L columns and K CQIs corresponding to K of the L columns.

13. The UE of claim 12, wherein the processor is configured for selecting K of the L columns of the N×L precoding matrix comprising:
   selecting K of the L columns of the N×L precoding matrix having the best CQI by the UE.

14. The UE of claim 12, wherein the processor is configured for selecting K of the L columns of the N×L precoding matrix comprising:
   receiving information related to a configuration which determines K of the L columns over the receiver.

15. A user equipment (UE) comprising:
   a transmitter for transmitting wireless data;
   a receiver for receiving wireless data;

a processor coupled to the transmitter and the receiver and is configured for:

receiving via the receiver a signaling comprising a first information related to a N×L precoding matrix having N rows and L columns with each of the N rows corresponding to an antenna port and each of the L columns corresponding to a user, wherein N and L are both integers greater than one;

obtaining from the first information the N×L precoding matrix;

determining from the L columns a preferred column;

determining a first co-scheduling hypothesis comprising a first set of indexes of M of the L columns, where M is an integer and 1<M≤L, and the indexes of the M of the L columns represent columns to be concurrently used when the preferred column is used by the UE;

calculating a first CQI by using the preferred column and the first co-scheduling hypothesis; and transmitting via the transmitter a second information indicating the preferred column, the first co-scheduling hypothesis, and the first CQI.

16. The UE of claim 15, wherein before the processor is configured for receiving via the receiver the signaling comprising the first information related to the N×L precoding matrix, the processor is further configured for:

receiving from the receiver the indexes of M of the L columns for the first co-scheduling hypothesis.

17. The UE of claim 15, wherein the processor is further configured for:

determining a second set of indexes of the M of the L columns represent columns to be concurrently used when the preferred column is used by the UE; and calculating a second CQI by using the preferred column and the second co-scheduling hypothesis.

18. The UE of claim 15, wherein an index corresponding to the preferred column is represented by a binary value.

19. The UE of claim 15, wherein the first set of indexes of the M of the L columns is represented by a (L−1) bits bitmap sequentially representing the L columns except for the preferred column with each bit of the (L−1) bits binary sequence representing a different column of the L columns other than the preferred column.

20. The UE of claim 19, wherein each of the (L−1) bits binary sequence has a first state and a second state, wherein the first state represents a column which is to be hypothetically assigned.

* * * * *